(No Model.)

G. C. TWYMAN & M. E. THOMAS.
COW MILKER.

No. 564,126. Patented July 14, 1896.

Attest:
Edw. C. Duvall Jr.
W. T. S. Duvall

Inventors
Goodloe C. Twyman
Martin E. Thomas
by
W. S. Duvall
Atty.

THE NORRIS PETERS CO., PHOTO-LITHO., WASHINGTON, D. C.

UNITED STATES PATENT OFFICE.

GOODLOE C. TWYMAN AND MARTIN E. THOMAS, OF BOWLING GREEN, KENTUCKY; SAID THOMAS ASSIGNOR TO SAID TWYMAN.

COW-MILKER.

SPECIFICATION forming part of Letters Patent No. 564,126, dated July 14, 1896.

Application filed June 18, 1895. Serial No. 553,245. (No model.)

*To all whom it may concern:*

Be it known that we, GOODLOE C. TWYMAN and MARTIN E. THOMAS, citizens of the United States, residing at Bowling Green, in the county of Warren and State of Kentucky, have invented certain new and useful Improvements in Cow-Milkers; and we do hereby declare the following to be a full, clear, and exact description of the invention, such as will enable others skilled in the art to which it appertains to make and use the same.

Our invention relates to improvements in cow-milkers, and the objects in view are to produce a simply light and conveniently-handled device adapted to be applied to the teats of cows for the purpose of extracting the milk from their udders, said device being so constructed and capable of operating upon the teats as to accurately imitate the action of the human hand in manipulating the teats, and thereby avoid any injury thereto while it effectually performs the objects in view.

Other objects and advantages of the invention will hereinafter appear, and the novel features thereof will be particularized in the claims.

Figure 1:
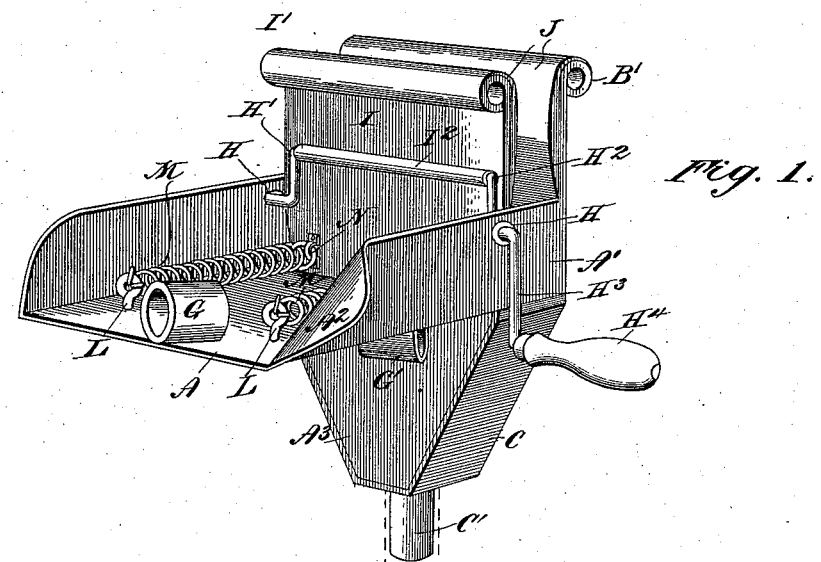
Figure 2:
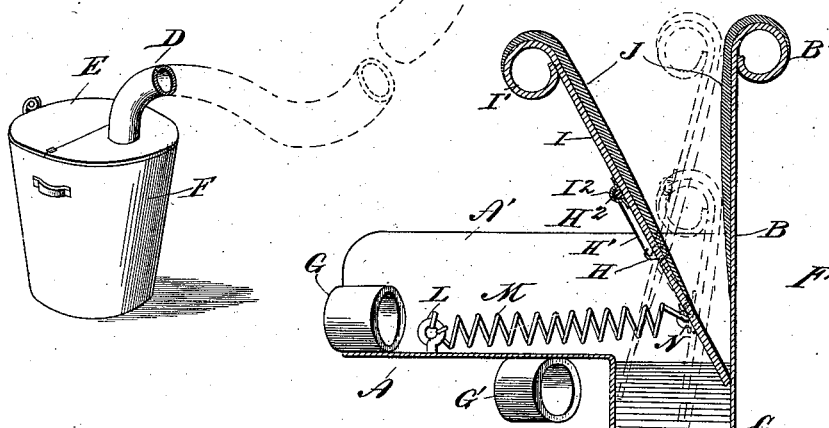

Referring to the drawings, Figure 1 is a perspective view of a cow-milker embodying our invention, the same being shown in connection with a milk-pail. Fig. 2 is a vertical transverse sectional view, the movable jaw being shown in the various positions it assumes as it operates.

Like letters of reference indicate like parts in both views of the drawings.

In practicing our invention we preferably construct the device from sheet metal, although it will be understood that other material may be used.

We employ a horizontal plate A, provided at opposite sides with the vertical walls A', the front corner of one of which is bent, as at $A^2$. The rear end of the plate A is bent downwardly, as at $A^3$, the edges thereof being reduced. In rear of the depending portion $A^3$, and between the rear ends of the walls A', we locate a back wall B, which at its upper end extends above the walls A', and has its upper edge curled outward or beaded, as at B'. That portion of the back wall B that is above the walls A' forms the fixed jaw of the milker. Below the walls A' the back wall B is reduced at its opposite edges to conform to the contour of the depending wall $A^3$, and the edges of the two walls are connected by a bottom C, said depending wall and back wall combining with the bottom C to produce a funnel. The bottom C is provided at its center with a discharge-spout C', which is designed to connect with a rubber tube D, which latter passes through an opening formed in the lid E of a milk-pail F. It will thus be seen that the milk passes directly from the udder of the cow through the funnel and tube into the covered pail, and therefore cannot become impregnated with dust.

Upon the upper and under sides of the plate A we affix thumb and finger holds, respectively, G and G', the same being set at such relative angles as to receive the thumb and finger when the hand of the operator is in the act of grasping the front edge of the plate A, and thus presenting the device to the teats.

In advance of the fixed jaw B bearing-openings H are formed in the wall A', and in the same there is journaled for rotation a shaft H'. This shaft H' is centrally cranked between its bearings, as at $H^2$, and at one side of one of its bearings, beyond which it extends, it is cranked, as at $H^3$, and carries a convenient handle $H^4$, by which it may be operated by the remaining hand of the operator.

A movable jaw I is located between the two walls A' and immediately in front and a slight distance from the fixed jaw B, the lower end of the former jaw being reduced at its opposite edges, so as to extend down into the funnel, and its upper edge being curled or beaded, as at I'. A metal loop $I^2$ is secured to the back of the jaw I, and through the same passes and works loosely the cranked portion $H^2$ of the shaft H'. The inner or meeting faces of the two jaws are covered with soft rubber J, which extends well over the curls or beads B' and I', so as to prevent abrading the teats and afford sufficient frictional surface to hold or grasp the same.

A pair of eyes L are located on and extend up from the plate A, and to the same are connected the rear ends of a pair of coiled springs M, the opposite ends of which are connected to loops N on the back of the movable jaw I.

In operation the thumb and forefinger are passed through the loops G and G', respectively, and the crank-handle H⁴ rotated until the crank portion H² forces the movable jaw to the position shown in Fig. 2. The device is then applied to the teat, after which the revolutions of the crank-shaft are continued. During such revolutions the movable jaw assumes the positions shown in Fig. 2, (dotted lines,) and as therein illustrated the teat is first engaged between the jaws, after which the movable jaw moves downward, gently squeezing the teat during such movement and causing the fluid to be drawn therefrom in the same manner as when the teats are manipulated by the human hand. As the milk flows from the teats it passes into the funnel-shaped bottom of the device and is from thence conducted by the rubber tube to the closed pail.

The gentle rapid manipulations of the jaws upon the teats greatly facilitate the operation of milking, greatly relieve the hands of the operator, and cause no discomfort whatever to the cow, and besides is much more cleanly.

Having described our invention, what we claim is—

1. In a cow-milker, the combination with a horizontal plate provided at opposite sides with bearings, the funnel located at one end of the plate, a fixed jaw arranged above the funnel, a movable jaw arranged at one side of the fixed jaw, a crank-shaft journaled in the bearings of the plate in front of the movable jaw, said shaft being provided at one end with a handle and having its intermediate cranked portion loosely connected with the movable jaw, and a coiled spring connected to the plate and to the movable jaw, substantially as specified.

2. In a cow-milker, the combination with a horizontal plate provided at opposite sides with bearings, a funnel-discharge located at one end of the plate and having its back wall extended above the latter to form a fixed jaw, a movable jaw located opposite said fixed jaw and adapted to pass into the upper end of the funnel, the transverse shaft journaled in the bearings of the plate, said shaft having at one end a handle and between its ends cranked and connected loosely with the outer face of the movable jaw, and coiled wire springs loosely connected to the movable jaw near its lower end and at their outer ends to the plate, substantially as specified.

3. The combination with the plate A, having the sides A' extending therebeyond, the funnel depending between the sides below the plate and terminating in the discharge C', the rear wall of said funnel being extended thereabove to form the fixed jaw B, provided with the rubber lining J, of the movable jaw I, having the lining J and loop I², the bearings H, the crank-shaft H', bent at H², H³, the handle H⁴, the eyes L and N, the intermediate connecting-springs M, and the fingers G and G', arranged as shown, substantially as specified.

In testimony whereof we affix our signatures in presence of two witnesses.

GOODLOE C. TWYMAN.
MARTIN E. THOMAS.

Witnesses:
J. M. WARD,
GEO. R. GORIN.